Nov. 30, 1954  M. E. EVANS  2,695,546
FILM PULLDOWN MECHANISM
Original Filed Oct. 10, 1949  4 Sheets-Sheet 1
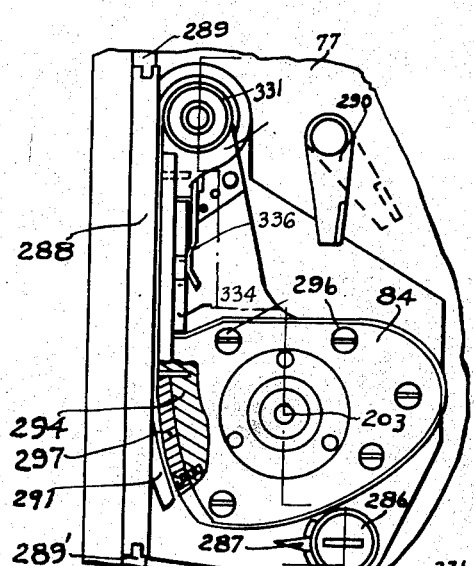
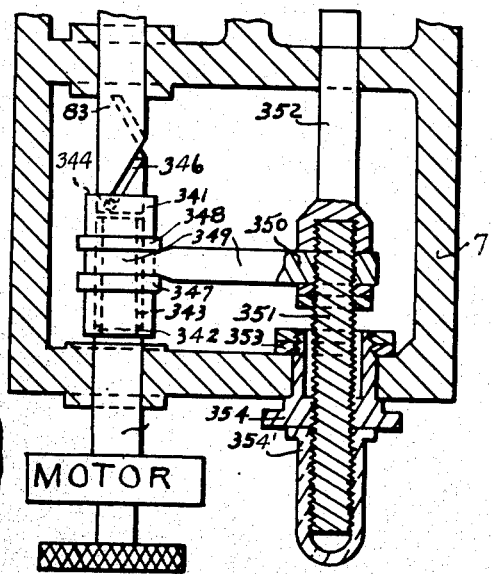
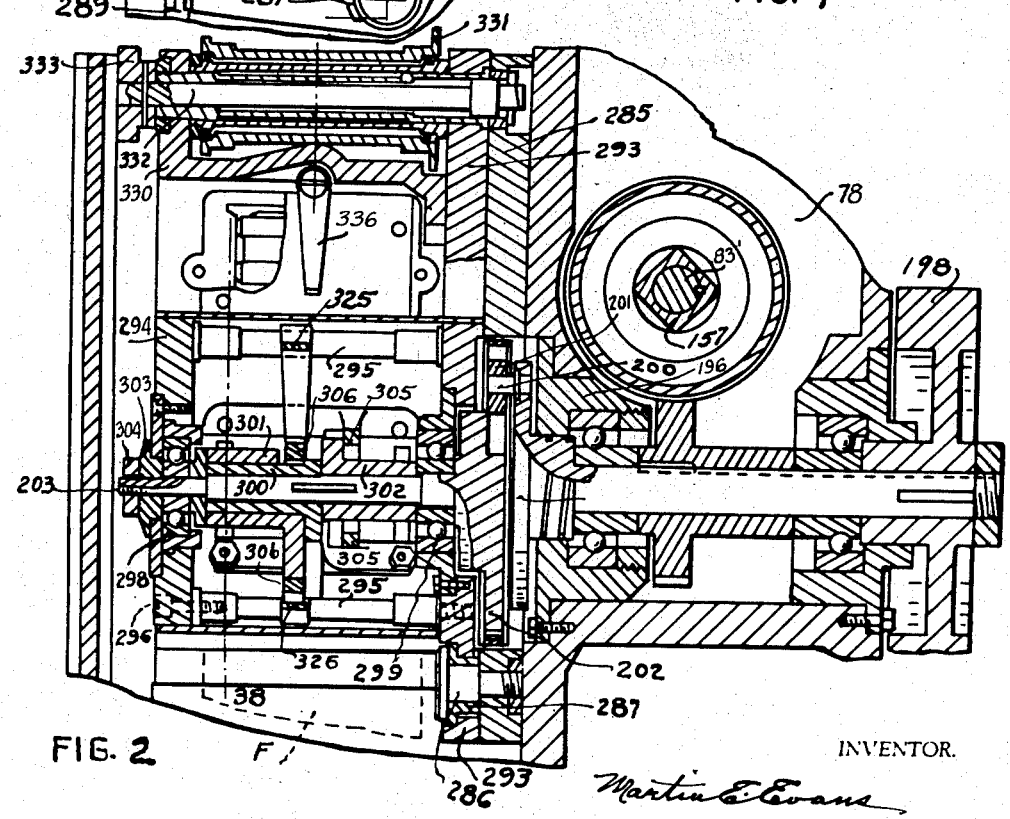
INVENTOR.
Martin E. Evans Nov. 30, 1954      M. E. EVANS      2,695,546
FILM PULLDOWN MECHANISM
Original Filed Oct. 10, 1949      4 Sheets—Sheet 2
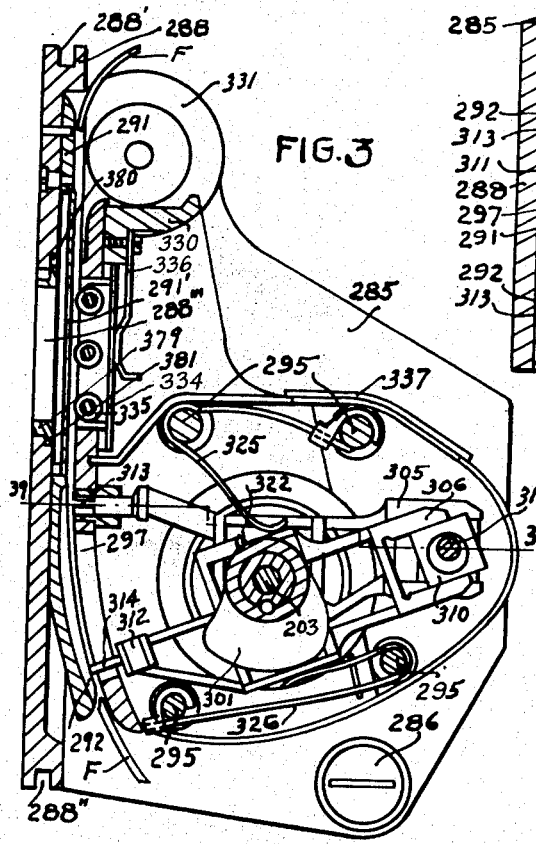
FIG. 3
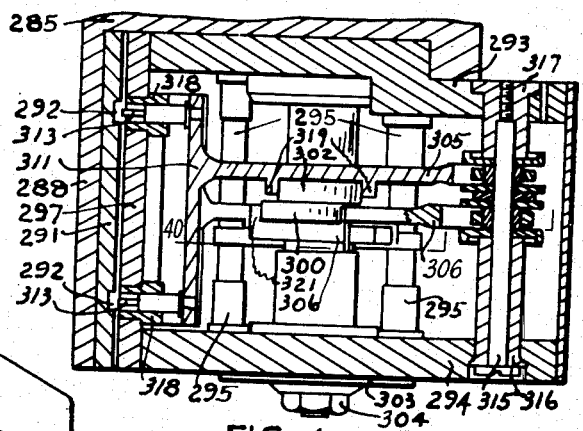
FIG. 4
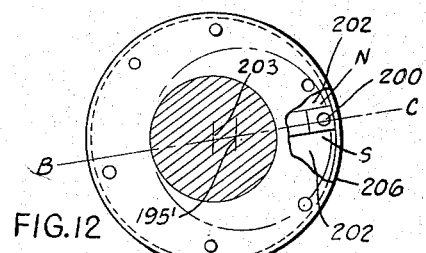
FIG. 12
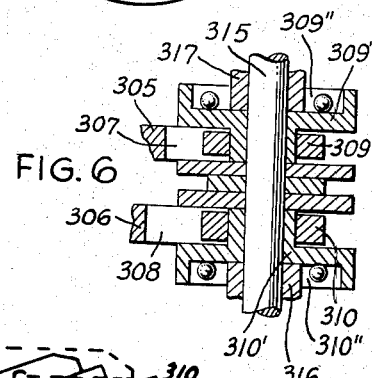
FIG. 6
FIG. 5
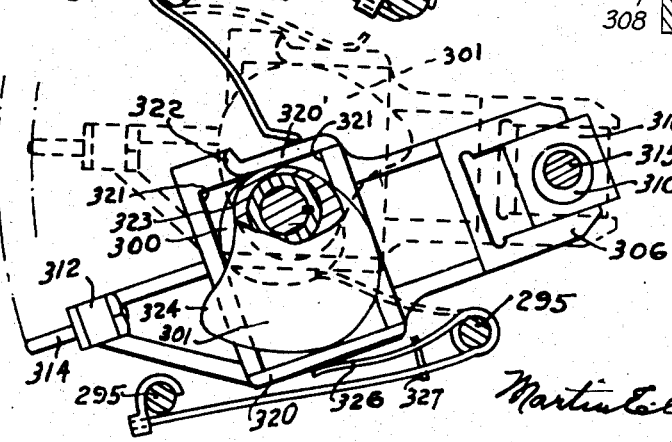
INVENTOR.
Martin E. Evans

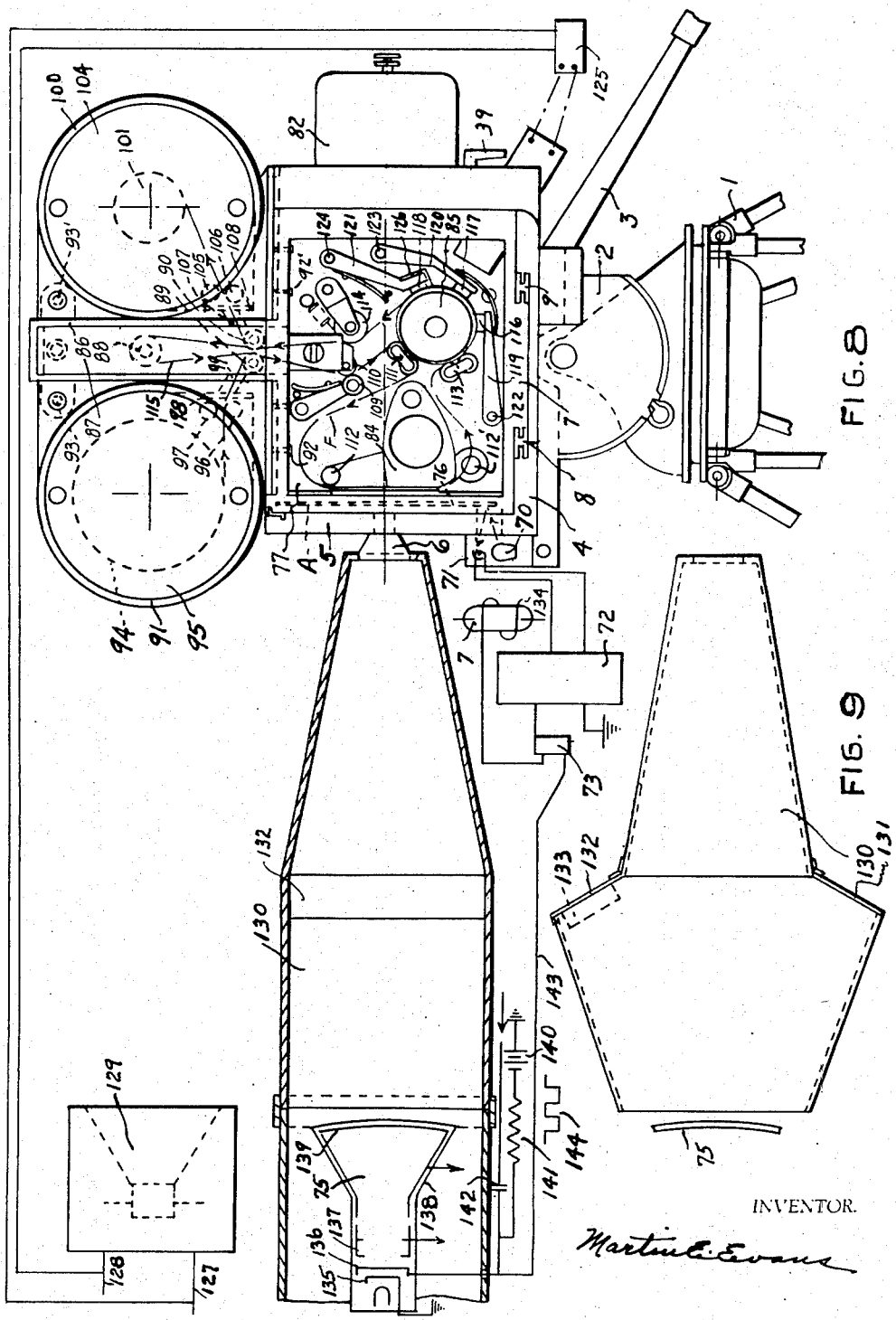

Nov. 30, 1954 — M. E. EVANS — 2,695,546

FILM PULLDOWN MECHANISM

Original Filed Oct. 10, 1949 — 4 Sheets-Sheet 4

INVENTOR.
Martin E. Evans

United States Patent Office 2,695,546
Patented Nov. 30, 1954

2,695,546

FILM PULLDOWN MECHANISM

Martin E. Evans, Brooklyn, N. Y.

Original application October 10, 1949, Serial No. 120,563, now Patent No. 2,661,652, dated December 8, 1953. Divided and this application February 14, 1951, Serial No. 210,897

14 Claims. (Cl. 88—18.4)

This invention relates to motion picture machinery and more particularly to intermittent motion mechanism for moving motion picture film in either a camera or a projector.

In the operation of a motion picture camera and a motion picture projector there is the common problem of positioning the film for successive exposures in the camera and for successive projections in the projector by concentrated guided and interrupted light. There is a relation between the rate of exposure and the rate of projection. For reproduction of movement as it occurred, the two rates should be the same. Currently, the film movement is positively tied to the positive driving mechanism chain and therewith the lineal movement of the film is restricted.

It is an object of this invention to provide means for releasing film from limitations to linear movement during pull down due to retarding action of standard drive mechanisms. Another object is to provide means to change the rate of lineal movement of the film to accord with exposure and projection requirements at different film rates. Another object is to provide cooperative two drive mechanism for film pull down operation. Another object is to provide a power accumulator as part of the pull down mechanism to receive power during the non pull down interval and to give out power to effect the pull down operation. Another object is to provide a floating claw pull down mechanism. Another object is to provide an over-running pull down mechanism.

An example of the need for freedom of the film from the restraining action of the angular driving mechanism is shown in the photography of scenes occurring on a television screen. There the scene is built up line by line 60 times a second with spaces between the sloping lines, so that two of these pictures called fields fit together to form frames at the rate of 30 per second. Supposedly, there are 525 lines in a frame, 262½ lines to a field, odd lines being scanned first, then the even lines, the half line ending in the center for the odd scanning and at the right of the picture for the even lines, the scanning having started at the upper left of the picture.

The cathode ray tracing the pictures is blanked from the screen during retrace intervals from the right to the left and from the bottom to the top of the picture so that the ray may not mar the picture with a line that carries no picture information. Due to the blanking period and operating inertias inherent in moving instrumentalities, even electronic, only 450 to 500 of the picture lines in the example chosen are active as picture on the screen. Thus it is seen that 13 to 20 lines of each field time are blanked each $1/60$ second. This portion of $1/60$ second is too short to effect the pull down operation of the camera taking an exposure by the light emanating from the screen. Hence it is necessary to operate a motion picture camera with an intermittent film movement at a rate less than 30 per second. This means that all information appearing on the screen is not recorded. However, sufficient information may be recorded at various rates to be reproduced satisfactorily, such frame rates ranging from 6 to 24 per second for television frames appearing at 30 per second.

Pull down mechanisms have cyclic operation. The cycle as related to the film includes engagement of a claw with an aperture in the film, movement of the claw downward with the film, disengagement of the claw, its return to the engaging position and re-engagement with the film at a point adjacent a new frame. These cyclic operations are effected by mechanisms having rotary actuating movement. The angular displacement of the rotary member is usually used to measure the interval of operation. The pull down interval here under consideration for a standard motion picture camera may be taken as 157° for 35 and 16 millimeter cameras of professional quality as manufactured by J. M. Wall, Inc., Syracuse, N. Y. This interval also may be referred to as the minimum closure interval of the shutter to cover the pull down action from the film.

To obtain the maximum information from the television screen, taking pictures therefrom at a 24 frame per second rate, a shutter of 72° closure is used with a pull down angle of 60° or less, currently as low as 45°. At a 6 frame per second rate the 45° pull down interval represents $45/360 \times 1/6 = 1/48$ second pull down time. This is too long a period as compared with $72/360 \times 1/24 = 1/120$ second pull down time at the 24 frame rate. At 6 frames per second rate a pull down of $1/120$ second requires $x$ degrees where $x/360 \times 1/6 = 1/120$ and $x$ equals 18°.

At 8 frames per second rate a pull down of $1/120$ second requires an angular movement of 24°.

At 12 frames per second rate a pull down of $1/120$ second requires an angular movement of 36°.

At 18 frames per second rate a pull down of $1/120$ second requires an angular movement of 54°.

As currently practiced, once the relationship of pull down time to angular movement is established, this remains fixed and permits no change. It is an object of this invention to provide means for choosing between an upper and a lower pull rate at a given frame rate.

Further objects of the invention and novel features will be apparent from the following specification and drawings in which Fig. 1 is a side view of an intermittent pull down mechanism.

Fig. 2 is a sectional view of Fig. 1 along line 37—37.

Fig. 3 is a partial sectional view of Fig. 1.

Fig. 4 is a sectional view of Fig. 3 along line 39—39.

Fig. 5 is an enlarged partial sectional view of Fig. 4 along line 40—40.

Fig. 6 is an enlarged partial sectional view of Fig. 4.

Fig. 7 is a horizontal sectional view of a phasing device between the motor and camera drive shaft.

Fig. 8 is a front side view of a motion picture camera incorporating the subject pull down mechanism and mounted on a tripod before a television receiver.

Fig. 9 is a plan view of a dark tunnel isolating extraneous light from that passing from the television receiver tube to the camera of Fig. 8.

Fig. 10 is a divided time chart showing the relation between events on a 30 frame television tube screen and the operative activities of a motion picture machine operating at various rates. It occupies the left two-thirds of the sheet.

Fig. 11 is a chart similar to Fig. 10 for a television rate of 72 frames per second. It occupies the right one-third of the sheet.

Fig. 12 is a partial sectional view showing the offset relationship of driving and driven shafts for variable speed drive.

Referring to Figs. 2 and 12, the shaft 195 carries a disk extension 199 with crank pin 200 supporting a drive block 201. The block 201 fits into a slot of disk 202 on shaft 203 which operates the pull down mechanism 84. The radial slot is covered wholly on one side by a disk plate and partially on the other side by a disk plate slotted to permit travel therein of the pin 200. The alignment of shaft 203 relative to shaft 195 is offset so that the action of the pin and block is to provide an acceleration of rotary movement on its down drive of the pull down mechanism 84. As shown in Fig. 12, the sides of the block slot are magnetized having north and south poles between which the block 201 is reciprocated. On the median line B—C of the stroke, the centers of shafts 203 and 205 and of pin 200 are in alignment, the pin 200 and the block 201 being at the outer end of their travel in the slot. The operational effect of the mechanism is obvious. After mechanism 84 has been pivoted about member 286 for disengagement from the film and the pin-block-slot position shown in Fig. 12 has been approximated, mechanism 84 may be readily disengaged from and re-engaged with driving pin 200. Mechanism support member 288 may be moved along mounting members 289, 289' thereby providing direction of movement of block 201 along the axial line of pin 200.

This application is a division of subject matter from copending application Serial No. 120,563, filed October 10, 1949, now Patent No. 2,661,652, issued December 8, 1953.

A camera set up to photograph a television screen is shown in Fig. 8 to illustrate the problems the invention helps to solve. In said figure a tripod 1 carries a head 2 on which is mounted a camera base 4 with a front upstanding mount 5 for lens 6. In camera case 7 suitably mounted on base 4 are the pull down mechanism 84, drive sprocket 85 and suitable film guides, shutter A, exposure aperture and other needed accessories for progressively exposing film F to a television screen 139 shielded by a light tunnel 130. Motor 82 through connections not shown drives sprocket 85 and pull down 84 with intermediate phasing means detailed in Fig. 7. Shown in Fig. 8, an endless belt 115 operates inside the camera along the film path to convey the film through its devious path, first in a threading operation and then as a reinforcement to the film in the special pull down operations. It operates outside the camera over pulley 88, is perforated as is usual for the film, receives the film thereon over roll 89 and discharges it therefrom over roll 90. Pressure adhesive means between the film and the belt are utilized to provide adhesion between belt and film to effect joint operation along the film path. Full description of the figures is given in the parent reference and only such reference is here made as is needed to set forth the pull down problem involved. The problem here of photographic recording involves the relative timing of the operation of the camera parts and the occurrence of the images on the television screen.

A further problem of adapting the camera and the pull down mechanism thereof to picture projection involves disposition of operating parts of the mechanism relative to the associated exposure aperture in a position to give access to the aperture from the dark chamber. In the parent application arrangements are provided whereby the door of case 7 is enabled to support lamp 74 and light from the latter is reflected from the dark chamber through the exposure aperture. Space must be kept clear for this light passage above the operating mechanism. To this end this invention provides special elements particularly shaped to expand and contract within the normal confines of the mechanism.

Referring to Fig. 10. This chart is in two divisions headed by frames per second operation of the camera ranging from 6 to 24 frames. Extending downward to the left of the headings are divisions from 1 to 30 in the first and from 31 to 60 inclusive in the second division. These divisions represent time occupied by a television field at the rate of 60 per second. Alongside these divisions are numerals representing the television frame time, two fields being used for a frame. Alongside the frame numbers occur the letters R, B, G, representing red, blue, green the primary color occurrences which are transmitted by the noted fields and frames of television. The sequence of camera events and relative time periods are depicted in the vertical graph under each camera frame rate. The rectangular boxes represent the exposure periods. The line openings facing the right represent the pull down periods, and the line openings facing the left represent dark periods additional to the dark pull down periods. Thus under camera frame rate of 6 per second and opposite the fifth frame which is marked B we find in the graph the opening to the right indicating pull down period. Here the pull down period is $a'+b'$. At 6 frames per second $a'+b'$ is 4 times the pull down period $a'$ shown under column heading 24 for 24 frames per second. To maintain the pull down period at $a'$ for the 6 frame rate, a switch to the drive by spring 325 is required. By this switch the period $b'$, or $3a'$, is made available for making exposures. Similar relationships for various rates of operation may be entered on the chart to show the picture periods available for recording. This is of particular importance in recording color images from the television operation. The pull down period has been based on the use of a 72° shutter closure, the remaining 288° being open period. Also, the pull down period is shown to occur after exposure, so it is shown in all cases as the last occurrence in the camera cycle. The color values appear in black and white as first recreated on the receiver tube screen. Hence the need for color screens in photographing the screen is absent. However, an indicator of the segment of color analysis being photographed is necessary and this is operated as a part of color recording not here described. Under the 6 frame column the first exposure is shown in rectangle R opposite frame 1. The next three frames must be blanked out until the mechanical 72° sector appears for the pull down blanking. This is accomplished by manipulation of the shutter. These remarks only apply to the sequential field color system.

Referring to Fig. 11, graphs for camera frame rates of 6 and 24 per second and a television rate of 144 fields or 72 frames per second are presented, similar to Fig. 10. The horizontal line in the pull down portion of the graph indicates a division of the pull down time, $a+b$ being the pull down time for the usual running of the pull down mechanism, $b$ being the time for pull down with overrunning operation, and $a$ giving the additional interval of television picture made available for photography by the overrunning operation, so that full color fields are recorded as at 70 of the 24 frame rate.

On an L-shaped piece 285, identified in Fig. 1, is hinged pull down mechanism 84 by bolt 286 with eccentric washer 287 thereon adapted to position the pull down mechanism relative to the front upstanding branch 288 of the L member. Member 288 has top and bottom grooves 288' and 288" respectively, which removably support the structure in case 77 by engagement with case tongues 289 and 289'. The assembly is held against removal by pivoted latch member 290 attached to the case wall. The full lines of member 290 show the latch down to hold the mechanism against movement in the direction normal to wall 77. The dotted outline shows the latch in position clearing the mechanism for withdrawal by sliding along the tongue members 289—289'. Fastened in an inset in member 288 is a plate 291, the two having aligned exposure apertures 288'", 291', respectively, fitted with color screens. Grooves 292 in the plate 291 accommodate entrance of pull down pins. The parallel back plate 293 and front plate 294 are held in spaced relationship by separators 295 screwing into plate 293 and receiving screws 296 through plate 294. Film guide plate 297 extends across the plates 293 and 294 and the intervening space. Plate 293 extends below 294 and has rests on the bushing 287 which pivots the pull down to the L member 285. The bushing 287, shown in cross section in lower part of Fig. 2, is slightly eccentric, sufficiently so to shift the mechanism 84 from plate 288 to accommodate passage of film alone or film plus operating belt 115 shown diagrammatically in Fig. 8, adjacent the film magazines and along the film path through the camera. The pull down drive shaft 203 is carried by bearing 298 and 299, identified in Fig. 2. On the shaft 203 are mounted cam members 300, 301, 302 held in position by spacers terminating with exterior member 303 driven by the shaft and held in place by nut 304. The member 303 is variously shaped, as a washer, as a gear, or as a cam member in various illustrations to follow. Between the side plates 293 and 294 a pair of beam members 305 and 306 have their mid portions around the shaft 203 and possess forked end portions 307 and 308 respectively, which slide on blocks 309 and 310 respectively, at one end. At the other ends the beams possess cross members 311 and 312 respectively, with projecting pins 313 and 314 respectively. The blocks 309 and 310 are supported on adjustable eccentric bushings 309' and 310' respectively, with rim extensions 309" and 310" respectively, in which holes accommodate insertion of pins for position adjustment. The eccentrics are supported on a tie rod 315 with spacer plates between them and with spacer bushings 316 and 317 on their outer sides which are held by the tie rod against side plates 293 and 294. Rod 315 threads into bushing 317. Adjacent the pins 313 on cross member 311, bushings 318 mounted on member 297 guide the pins in their movement and serve to support the unforked end of beam 305. Beam 305 carries upright side extensions 319 against which cam 302 operates to impart thereto a reciprocating motion. Beam 306 carries horizontal extensions 320, 320' against which cam 301 operates and vertical extensions 321 against which cam 300 operates. Beams 305 and 306 are so coordinated in their actions that the pins 313 on beam 305 hold the film stationary while pins 314 on beam 306 are withdrawn from the film and returned to the pull down position, and pins 313 are withdrawn suitably from the film to permit the down pull of film. Cam 301 moves the beam up and down. Cam 300 moves it back and forth. The combined action imparts an oscillatory motion. The offset position of shaft 203 relative to driving shaft 199 causes the shaft 203 to have an accelerated down stroke and a slow up stroke relatively. Acceleration beyond that due to the downward pressure of cam 301 is obtained by shortening extension 320' and cutting the heel of cam 301 between points 323 and 324 so that the shoulder 322 may ride down the cam face 324—323 under pressure of propelling spring 325. Spring 325 is anchored on one of the upper separators 295 and passes around the other which acts as a fulcrum. Referring to Fig. 5, the spring is shown in full line in the expanded condition at the end of a down stroke. In broken lines it is shown in the compressed state at the end of the upper stroke. The end of the down stroke is retarded by contact of beam 306 with leaf spring 326 on the lower side which is anchored to one of the lower separators 295 and passes around the other as a fulcrum. Clip 327 on spring 326 by change of longitudinal position may regulate the shock absorbing action of 326. Also, clip 327 may be similarly placed on spring 325, in which case the downward movement of beam 306 would be continuously under the pressure of cam 301, the accelerated upward movement of beam 306 being arrested by spring 325. It is this construction which permits the down stroke with a rotary movement of approximately 24 degrees. The opening diameter of bearing 298 in the side plate 294 is intended to accommodate change of cam 301 whereby the tearing down of the pull down assembly is avoided for replacement.

The above mentioned contact of beam 306 and member 326 provides a decelerating action on the down coming assembly without rebound. The limit of the descent is determined by contact of members 320' again with cam 301 from which it had departed following the departure of member 322 from point 324. The line 324—323 may be variously shaped in accordance with the operation contemplated. Under impetus of spring 325 the member 322 may ride down the line 324—323 at a rate faster than would be provided by cam 301 pressing down on member 320. If the line 324—323 is sufficiently under cut the point 322 may depart abruptly from point 324 and a free descent of the beam will result. This is referred to as an overrunning action. Under the latter circumstances the decelerating force is to be applied by adjustment of member 327 so that 320' and 301 meet under pressure of spring 325 but without shock.

The abrupt action just described puts a heavy strain upon the film. To reinforce the film to take this strain additional features are associated with the pull down mechanism to operate therewith in the loose film path through the exposure area. Referring to Fig. 8, an endless belt 115 is shown operating through the film path in the camera case and additionally over roller 88 with tensioning rollers 89 and 90. The film is fed into the camera between the roll 89 and belt 115 and fed out between roll 90 and belt 115. With the inclusion of the belt with the film in the exposure area, positioning means for the pull down mechanism are provided by the eccentric form for bushing 287 shown in section on member 286 in Fig. 2.

Referring to Fig. 5, and particularly to the dashed outline, the cam 301 shows a lobe extending to the right. As this lobe approaches point 322 of the follower 320' in its rotation upwardly and to the left, the line 324—323 of the cam becomes upright and as it moves on the point 322 under impetus of spring 325 momentarily assumes an overrunning action by dropping free of cam 301. During this downward course, the cam 301 has moved angularly so that the point 322 and the cam 301 reestablish contact by a wiping action during the last fraction of the pull down. Graduated restraining action over a short interval of down travel thus serves to relieve the impact that would otherwise arise from sudden termination of the action. Also suitable adjustment of spring 326 will assist in terminal action. There is thus shown to be a relation between film strength, overrunning action, form of cam face, rotation speed of cam and spring adjustment. The construction of the pull down mechanism is such that it can be readily removed from the camera and the cam 301 be exchanged or adjusted for various operating rates where the range for the one cam does not apply. Choosing the operating rate as a starting point then the suitable cam interval can be introduced in the mechanism and suitable spring adjustments can be made.

Taking television recording as an instance, as previously outlined, the exposure is set by the television apparatus, the pull down interval may be timed to 18° for 6 frame rate, 24° for 8 frame rate, 36° for 12 frame rate, 54° for 18 frame rate, by way of example. Since the television receiver and the camera drive motor operate from a common source of alternating current, synchronous operation of the motor is utilized to keep camera and receiver in proper operating relationship. With proper rotational operation of the intermittent mechanism thus assured the suitable cam face 324—323 can be introduced for accurate pull down independent of the down operation by cam 301. The accurate timing of the start of the pull down may be done with mechanism set forth in Fig. 7, and changes therein observed through operation of light 74 shown in Fig. 8, and given in detail in the parent application. The light 74 is set to illuminate at the beginning of pull down and adjusted to do the same at the blanking time for receiver image tube 75.

The camera action is definitely timed and accurate because the spring 325 brings down arm 306 and pins 314 in a definite angular movement of cam 301 which has a definite face form 324—323 to spread the travel over the corresponding angular interval, 18° for 6 frame rate—and so on as above outlined.

Where the cam for the lesser angular rate is in position and the camera is operated at a higher rate, the accuracy is not vouched for since the overrunning action then occurs and the adjustments therefor cannot be on a close angular basis.

When the latch member 290, shown in Fig. 1, is moved to the broken line position, the withdrawal of mechanism 84 may be effected in a direction normal to case 77 and along guides 289—289'. As this is done, drive block 201, which readily slides in a slot in ring member 202, is separated from drive pin 200. Block 201 should be retained in its radial position as of when withdrawn to facilitate reentry of pin 200 therein when reassembly takes place. To this end, the block 201 is of material attracted by a magnet and member 202 is of highly magnetic material such as alnico and formed as a ring magnet. The application of some slight force to the block 201 is required to move it along the slot. No such force is applied once the separation from pin 200 is effected, and thus the magnetic relationship operates to keep the block in place for union with the pin.

Returning to Fig. 5, it is seen that there is a first cam 301 and a second cam 300, a first yoke 320—320', and a second yoke having guide faces 321. The cams are connected through the aperture in the arm 306 for timed joint operation. They can only operate in timed relationship because of this tie. The cam 301 has the positive function of raising the arm 306. It has a function associated with spring 325 manifested by sliding contact of point 322 along line 324—323 to regulate the pull down movement during each interval of the descent where this contact is continuous. Where the contact is discontinuous the regulation is only during contact period.

The function of cam 300 operating on surfaces 321 follows the full cycle of mechanism operation. At end of pull down it moves arm 306 and withdraws pins 314, it then guides arm 306 in its upward movement as it is propelled by cam 301, it then moves arm 306 and thereby pin 314 into film engagement, it then maintains the engagement by guiding arm 306 during the pull down.

The functions of springs 325 and 326 depend on the mode of operation of the mechanism, variations being desirable in accordance with the character of the work.

Taking cam 301 of form to maintain continuous contact with its yoke members 320 and 320', the movement of arm 306 is at all times dependent on cam 301. With both springs 325 and 326 bearing on the arm 306 as the operation speeds up, the increasing inertia forces from the swinging arm are stored in the springs and pressure at the end of the stroke up or down upon the cam from the reverse side of the yoke is greatly relieved. The energy stored in the spring is temporarily locked in. As for example, in Fig. 5, with clip 327 removed, member 320 contacting spring 326 imparts thereto pressure from cam 301. As the speed of operation increases the inertia forces in arm 306 increase and can reach a point where the inertia force will equal the spring pressure as the end of the stroke is reached. An instant is required for reversal and during this instant the lobe 301 is practically free of pressure against member 320. With the spring held by clip 327 the inertia force in 306 would be concentrated in member 320' which would bear heavily on the cam 301 adjacent the drive shaft. The same description will apply at the reversal as shown in dashed outline, Fig. 5. Steady motion of the cam 301 is supplied through the connecting chain of elements to flywheel 198 shown in Fig. 2. The easing of the terminal pressures mentioned is in the nature of a flywheel effect and may be regarded as a supplement to action of member 198 under the circumstances just outlined.

Where the cam 301 is undercut as in Fig. 5, the giving out of energy by spring 325 is more abrupt and more rapid than for flywheel operating at cam rotational speed whence the action is called overrunning. This overrunning action frees the pull down from the operating restraint of rotating connected members.

The accumulation of energy in the spring 325 as a result of the upswinging action of cam lobe 301 in effect provides a reservoir of energy to supplement the down swing of cam 301 in the pull down operation in such cases as where the cam 301 is of the usual shape and exerts its down driving action through the pull down period.

To the upstanding plate 297 and plate 293 top cross support 330 is attached to form a support for top film guide roll 331. Through the center of roll 331 extends rod 332 with knob 333 on the end thereof adapted to turn the rod 332 to lock the structure of the pull down in position adjacent the member 291. Opposite aperture 291' in the plate 291 is an aperture in which fits a frame 334 in which fit rolls 335 held in place by a spring 336 pressing against the closure of the frame 334. The rolls 335 operate to press the film toward plate 291. The pins 314 extend through the film and traverse grooves 292 in their downward path of travel. The interior of the pull down enclosure is accessible by removal of cover plate 337.

Referring to Fig. 7, drive shaft 83 is shown terminating in abutment to the end of the motor shaft 340. A sliding tubular coupling 341 joins the two shafts. It carries at one end keys 342 which slide in straight longitudinal grooves 343 on motor shaft 340 and at the opposite end it carries key 344 which slides in helical groove 346 in the drive shaft 83. Both shafts have bearings in case 7. Between shoulders 347 and 348 on the coupling 341 a fork 349 engages the coupling and extends with stem 350 to a combination movable parallel to the aligned motor and drive shafts. The combination consists of a threaded rod 351 threaded into stem 350 and beyond to couple to a stem 352. Rotatably mounted in the wall in case 7 and retained by lock nuts 353 bushing 354 carries an internal thread through which extends threaded rod 351. Member 352 in alignment with rod 351 has a bearing in frame of case 7. Rotation of nut 354 moves the fork 349 and thus shifts the coupling axially along the two shafts 340 and 83 phasing the pull down mechanism relative to the motor. Transparent thimble 354' internally threaded acts as a lock nut on rod 351 by pressure against bushing 354 and gives by the position of the end of rod 351 an index of the phasing position.

In operation the mechanism may be assumed to be adjusted for operation at 24 frames per second in connection with copying information from a television or motion picture screen not shown. In this case the pull down should be actuated by the contact of lobe 301 with member 320 pressing against spring 326 with clip 327 removed to permit the spring 326 to operate continuously. The clip 327 in this case should be placed on compressed spring 325 to hold it in that state in retreat from member 320'. The clip form of restraint on the springs is presented as a simplification of other more complicated arrangements not shown adapted to the purpose and available for manipulation exteriorly of the frame. As the member 320 approaches the end of the upper stroke the driving connection 300—301—302 approaches the slow motion part of its stroke and the transfer of pressure by the spring 326 through member 320 from heel 324 to point 323 is eased along within operative limits.

With the mechanism adjusted for operation to the rate of 6 frames per second the pull down member 320' should be actuated in the down pull by spring 325 in which case the clip 327 should be positioned, as shown in Fig. 5, holding spring 326 compressed and in retreat from member 320. In this case as the pull down action is initiated the spring 325 pressing member 320' causes the shoulder 322' to ride down the face 324—323 at a rate exceeding the rate that can be imparted thereto through connections to member 320 and lobe 301. The member 320 departs temporarily from contact with lower side of lobe 301 in consequence of the release from restraint inherent in the form of cam face 324—323. As the lobe 301 continues its downward motion the contact with member 320 is re-established by a non shock wiping action acceptable from an operating standpoint. Further operating movements are obvious.

With the mechanism adjusted for operation as shown by dotted outline in Fig. 5, neither spring is restrained by clip 327. As rotation of cam 301 proceeds, follower portion 322 rides down face 324 under impetus of spring 325. Full downward movement of the lever is impeded by spring 326 and the two springs come into momentary pressure balance. Continued angular movement of cam 301 carries face 324 forward from the follower 322 so that momentarily the lever is floated between the balanced springs. In this area, the lever is completely free of the cam influence. Then cam 301 makes contact with follower 320 and by continued rotation draws follower 320' down to itself so that the cam spans between the followers 320 and 320'. This capacity for resilient momentary support of the lever promotes the starting of the pull down under spring influence and the continuation of the stroke under cam influence. Suitable spring pressure may thus be transmitted to film lacking strength sufficient to withstand the initial acceleration by the cam.

Comparing the various rates of pull down operation, it is seen that it is fastest when the upper spring operates alone on the lever, intermediate when the two springs operate to float the lever until the cam takes over to complete the pull down, and relatively slow when the lower spring only operates to hold the lower follower continuously against the leading part of the cam during the down period. The fast operation is interrupted by the lower spring providing the intermediate rate. The fast operation never gets started in the case of the slow rate.

As set forth in the parent application, the pull down co-acts with the shutter. The latter is particularly arranged for reverse operation and therewith the pull down mechanism to feed back the film as operating conditions require. In this connection, referring to Fig. 5, it is seen that reverse operation of the mechanism calls for clip 327 to be removed from the spring 326 and to be placed on spring 325. This is to avoid abutment of portion 322 against face 324 during reverse action, said abutment providing a positive stop with the parts undercut to the degree shown. Lesser amounts of undercut, according to degree, lessen the abutting action and slight amounts of undercut completely avoid the blocking action. The placement of clip 327 on spring 325 removes the latter from action in opposition to spring 326 and allows the latter to keep the follower 320 in contact with cam 301.

From the standpoint of professional operation 24 frames per second are desired in order to fit the film into the standard 24 frame projecting mechanism. From the standpoint of home use and economy 6 frames per second are desired and are herewith made feasible.

This same mechanism fits the projection requirements at 6 frame per second rate.

In the projection operation it is required that the projected light be divided into at least 48 bright periods and 48 dark periods per second to avoid objectionable flicker. With 6 frame operation per second, then, there must be 16 periods, 8 light and 8 dark per frame projected. With these periods of equal duration, each period would be 22½°. Accordingly, the cam face 324—323 would be shaped to pass the shoulder 322 therealong under impetus of spring 325 in a 22½° movement of the cam lobe 301. In this case an electronic means of light interruption would be required since a mechanical shutter at present does not appear to meet the requirements.

It will be apparent that various mechanical arrangements and devices other than those illustrated and described may be employed to effect the modes of operation and the results of the mechanical arrangements and constructions I have illustrated and described for illustrative purposes. Such arrangements and many variations and modifications of the apparatus illustrated and described will readily occur to those skilled in the art to which the invention is related and my invention should therefore be understood as not restricted to the specific embodiments illustrated and described but as including all arrangements, modifications and additions coming within the scope of the claims which follow.

I claim:

1. In an intermittent film mechanism, mechanism to move a film intermittently, drive shaft for said mechanism with a crank disk having a radial slot and a slidable bearing block therein; said block having a center bearing for a driving connection and a sliding fit for movement in said slot in response to pressure inside said bearing by said driving connection; a mounting for said mechanism whereby it is movable as a whole with reference to the film and to the driving connection; said disk and block having magnetic qualities to hold said block during disconnected period in position for receiving said driving connection.

2. In an intermittent film handling mechanism, a lever pivoted at one end and carrying a film engaging claw at the other end and having upper and lower cam followers; upper and lower springs effective on said lever for providing floating support to said lever when it is freed from management by said followers; a cam operative on said followers for energizing said springs and swinging said lever; said cam and said followers having a loose fit therebetween which frees the lever from follower control during intervals of operation thereof; said springs providing said floating support of said lever during said free interval in the operating cycle until the cam re-establishes contact with one of the followers and thereby management of said lever, and means for regulating the springs whereby the lower spring is enabled to act as a buffer when the lever becomes free during said intervals of loose fit.

3. In an intermittent film handling mechanism, a lever pivoted at one end and carrying a film engaging claw at the other end and having upper and lower cam followers, upper and lower springs for providing floating support and operation of said lever, and a cam operative on said followers for energizing said springs and swinging said lever; said cam and said followers having a loose fit therebetween during selected intervals of operation to accommodate said floating support and operation thereof; said loose fit permitting an interval of freedom from the cam, and holding means manually adjustable (1) for releasing one of said springs from an idle state into action against the other of said springs whereby said springs are arranged in opposition for providing floating support, and (2) for securing the other one of said springs from said opposed action, whereby said cam is changed from action on one follower to action on the other for changing the acceleration of the lever during the pull down period, said cam having (1) a leading section of one contour adapted to cooperate with the lower follower to produce one acceleration of the lever and (2) a trailing section of another contour adapted to cooperate with the upper follower to produce a different acceleration of the lever during the pull down period.

4. In an intermittent film handling mechanism, a pivotally slidably mounted lever carrying upper and lower cam followers and claw means; a propelling spring for pull down movement of said lever and a buffer spring for providing floating support for said down moving lever; a cam operative between said followers for energizing said springs and swinging said lever, said cam being adapted by a suitable wide dimension to engage said followers simultaneously for a period sufficient for guiding said lever in its sliding movement and by a suitable narrow dimension to engage only one at a time of said followers for other periods suitable (1) to complete a pull down movement aided by said propelling spring and (2) to return said lever to position for pull down movement; means for shifting said lever by sliding same over said cam at its wide dimension during said simultaneous engagement; said narrow dimension being suitable to accommodate completion of said pull down movement under the influence of said propelling spring only, and means for shifting and holding said buffer spring from said floating support position to allow said propelling spring to complete the pull down movement when such action is desired.

5. A movement mechanism including, a cam actuated mechanism operable to intermittently move a film and shiftable bodily to and away from the film into and out of operating position with reference to the film, a cam actuated mechanism operable to hold the film against movement, a drive shaft connection between said mechanisms coaxial with the axis of rotation of said cams whereby they are maintained connected to operate in synchronism, said film moving mechanism including upper and lower cam followers and a cam with associated manually adjustable upper and lower spring means permitting selective change in the duration of the pull down interval and the non-pull down interval, said cam having a full dimension between said followers changing on both sides of the full dimension from full to less than full and back to full dimension, forming two lobes of different shapes each in cooperation during pull down period with its own follower providing its own acceleration of film.

6. A movement mechanism including, an aperture plate, a carrier mounted for pivotal movement with reference to the plate, an arm carried by the carrier, a claw carried by the arm to engage a film at the plate, a cam carried by the carrier to operate the arm, an upper and a lower follower on the arm, an upper spring and a lower spring operative between said carrier and said arm, said cam having a cross dimension changing between the followers from full to less and back to full as the film is moved by said claw, the upper spring actuating the upper follower against the cam, the lower spring buffering the movement of said lever.

7. A movement mechanism including, an aperture plate 288, a drive shaft 195, a mounting for said plate 289 permitting movement to and away from the end of said drive shaft, a crank arm 199 on said shaft 195 carrying a crank pin 200, a carrier 293 carried by an extension 285 of the aperture plate 288 to move towards and away from the aperture plate, a cam shaft 203 mounted on said carrier having a crank 202 slotted to slidingly connect with said pin, a lever 306 slidably pivotally mounted on said carrier, a claw 314 mounted on said lever to engage a film at the aperture plate, upper and lower followers 320'—320 mounted on said lever, a cam 301 on said cam shaft between said followers to operate the latter; an upper spring 325 operative between the lever and the carrier, a lower spring 326 operative between the lever and the carrier, said cam having a cross dimension changing between the followers from full to less than full and back to full as the cam is rotated, the upper spring actuating the upper follower against the cam, the lower spring buffering the down movement of said lever.

8. A movement mechanism including, an operating shaft, an aperture plate, a mounting for said aperture plate movable to and away from the end of said shaft; a carrier carried by said mounting and movable to and away from the plate; an arm slidably pivotally carried by the carrier, a claw carried by the arm to engage the film at the plate; a cam carried by the carrier and a follower carried by the arm to operate the arm pivotally, the movement of the carrier being in a direction and of an extent to move the pin into and out of operating position with reference to the plate; variable speed drive means connecting said shaft and said cam to accelerate movement of the latter and which allows disconnection; a second follower on the arm, and means to switch followers on said cam during operation of said mechanism thereby changing the acceleration of said arm said cam having two operating parts each providing one of said two speeds, and spring means manually adjustable for maintaining in operation during the film moving period the one of said parts of said cam required for the selected one of said speeds.

9. A movement mechanism including, an upstanding film guide plate, an aperture in the upper part of said plate; removable cover means for said plate aperture, a pair of lateral members joined to said plate below said aperture, spacing means between said lateral members, a mounting plate, a connection between one of said lateral members and the mounting plate, a pivot member supported by said lateral members, a lever slidably pivotally mounted on said pivot member, a shaft supported by said lateral members, upper and lower followers on said lever; a cam on said shaft between said followers with a full dimension between said members and changing on both sides of said full dimension as it is rotated from full dimension to less than full and back to full dimension forming two lobes of different shapes, one on each side of said full dimension, each in cooperation during pull down period with its own follower providing its own film acceleration, means to hold said followers selectively against said cam manually adjustable to switch followers on said cam to change the acceleration of said lever, a driving connection to said shaft, an aperture plate on said mounting plate adjacent said guide plate, said apertures being aligned, removal of said cover permitting light to pass to the film over said lateral members, and a claw on said lever adjacent said aperture plate to engage the film.

10. A movement mechanism including, an upstanding film guide plate, a pair of lateral members joined to said plate below said aperture, spacer means between said lateral members, a mounting plate, an aperture plate on said mounting plate in front of the guide plate, said apertures being aligned to pass light from above said lateral members, a pivot connection between said mounting plate and one of said lateral members permitting the guide plate to swing toward and from the aperture plate, a pivot member supported between the lateral members, a lever slidably pivotally mounted on said pivot member, a shaft supported by said lateral members, a claw on the lever to engage the film at the guide plate, a cam on the shaft, a drive connection to said shaft permitting said movement of said guide plate, an upper and a lower cam follower for said cam and mounted on said lever, said cam having a full dimension between said members and changing on both sides of the full dimension as it is rotated from full to less than full and back to full dimension forming two lobes of different shapes, one on each side of said full dimension, each in cooperation during the pull down period with its own follower providing its own film acceleration, an upper spring and a lower spring operative between said lever and at least one of said lateral members to hold said followers selectively against said cam, manually adjustable means to switch said followers on said cam to change acceleration of said film; cover means for the aperture in the guide plate, removable laterally above said lateral members, said upper spring being of a shape to accept support between said lateral members and below the tops thereof to keep said line of light unobstructed, whereby said mechanism is enabled to move film past the same aperture for both recording images and for projecting the images after development.

11. A movement mechanism including, a cam actuated mechanism operable to intermittently move a film, and shiftable bodily to and away from the film into and out of operating position with reference to the film and movable bodily with reference to an operating support; a cam actuated mechanism operable to hold the film against movement; an operating shaft mounting said film moving cam mechanism and said film holding cam mechanism whereby they are maintained connected to operate in synchronism; a crank arm on said shaft for turning the latter, driving means carried by said first mentioned operating support, including a connection to said crank arm releasable by said secondly mentioned bodily movement, said driving means providing accelerated rotary motion to said film moving cam during said film movement; and means including an upper and a lower follower operative selectively on said film moving cam to accelerate the film at different rates; said cam having a full dimension between said followers and changing on both sides of the full dimension forming two lobes of different shapes, one on each side of said full dimension, each in cooperation during the pull down period with its own follower providing its own film acceleration, and means to hold said followers selectively against said cam manually adjustable to switch followers on said cam to change the acceleration of the film.

12. A movement mechanism including, a cam actuated mechanism operable to intermittently move a film, and shiftable bodily to and away from the film into and out of operating position with reference to the film and movable bodily with reference to an operating support, a film guide plate upstanding with an aperture above said cam actuating mechanism, removable cover means for said aperture; a cam actuated mechanism operable to hold the film against movement; an operating shaft mounting said film moving cam mechanism and said film holding mechanism; a crank arm on said shaft for turning the latter, driving means carried by said first mentioned operating support, including a connection to said crank arm disconnectable by said secondly mentioned bodily movement, said driving means providing accelerated rotary motion to said film moving cam; and means including said film moving cam, an upper follower above and a lower follower below said cam, and upper and lower springs selectively adjustable to actuate said followers selectively against said cam, to change acceleration of the film said cam having a full dimension between said followers and changing on both sides of the full dimension forming two lobes of different shapes, one on each side of said full dimension, each in cooperation during the pull down period with its own follower providing its own acceleration, and means to hold said followers selectively against said cam manually adjustable to switch followers on said cam to change acceleration of the film, said upper spring being mounted with said mechanism below the aperture to allow passage of projected light over the mechanism and through the aperture when said cover is removed.

13. A movement mechanism including, an arm, a claw on the arm for moving a film intermittently past an aperture, a short follower and a long follower carried by the arm, a cam between the followers changing from a full cross dimension to less and back to full, a first spring to press the short follower against the cam normally during the forward movement of the film; a second spring to press the long follower against the cam, and means manually adjustable to hold said short follower spring out of operation so that said long follower spring may press the long follower continuously against said cam whereby said short follower is maintained sufficiently removed from said cam to permit reverse operation of the cam, arm and claw for reverse movement of film.

14. In an intermittent film moving mechanism having at film engaging claw, a swinging lever carrying the claw, and a drive shaft, means operatively connecting the shaft with the lever including a relatively long leading follower and a relatively short trailing follower mounted on the lever and a cam mounted on the shaft to operate between the followers, said followers being spaced to permit the lever to swing the trailing follower out of contact and the leading follower into contact with the cam to operate the mechanism reversely, said cam operating to retard the trailing follower when in contact with the latter during forward operation and to retard the leading follower during reverse operation and also to abut the trailing follower and thereby prevent said reverse operation, and means manually adjustable for resiliently pressing said followers selectively against the cam during the operating cycle of the latter forwardly and reversely; said pressing means actuating said trailing follower against said cam during forward operation and said leading follower against the cam for reverse operation, the arrangement of the parts being such that the swing of the lever under the impetus of the pressing means on the leading follower lifts the trailing follower from position of abutment that would otherwise prevent said reverse operation.

References Cited in the file of this patent

UNITED STATES PATENTS

| Number | Name | Date |
| --- | --- | --- |
| 560,424 | Petit | May 19, 1896 |
| 814,406 | Smith | Mar. 6, 1906 |
| 1,220,195 | Cocanari | Mar. 27, 1917 |
| 1,648,559 | Mitchell | Nov. 8, 1927 |
| 1,680,659 | Bekesch | Aug. 14, 1928 |
| 1,707,943 | Pocovi | Apr. 2, 1929 |
| 2,144,277 | Wall | Jan. 17, 1939 |
| 2,346,070 | Fuller | Apr. 4, 1944 |

FOREIGN PATENTS

| Number | Country | Date |
| --- | --- | --- |
| 99,396 | Austria | Mar. 10, 1925 |
| 712,657 | Germany | Oct. 23, 1941 |